United States Patent [19]
Attinger et al.

[11] Patent Number: 5,291,961
[45] Date of Patent: Mar. 8, 1994

[54] MOUNTING ARRANGEMENT FOR A RADIATOR

[75] Inventors: Thomas Attinger, Stuttgart; Ingo Oses, Wäschenbeuren; Burkhard Raabe, Stuttgart, all of Fed. Rep. of Germany

[73] Assignee: Mercedes-Benz AG, Stuttgart, Fed. Rep. of Germany

[21] Appl. No.: 954,822

[22] Filed: Oct. 1, 1992

[30] Foreign Application Priority Data

Oct. 26, 1991 [DE] Fed. Rep. of Germany ....... 4135387

[51] Int. Cl.$^5$ .............................................. B60K 11/04
[52] U.S. Cl. ...................................... 180/68.4; 165/67
[58] Field of Search ............... 180/68.4, 68.5, 68.6; 248/232, 213.3; 165/67; 267/158, 160

[56] References Cited

U.S. PATENT DOCUMENTS

| | | | |
|---|---|---|---|
| 3,333,810 | 8/1967 | Schlapman | 180/68.5 |
| 3,700,061 | 10/1972 | Hortnagl | 180/68.4 |
| 4,196,774 | 4/1980 | Hoffmann | 180/68.4 |
| 4,417,635 | 11/1983 | Thepault | 180/68.4 |
| 4,846,295 | 7/1989 | Shepard et al. | 180/68.5 |

FOREIGN PATENT DOCUMENTS

| | | | |
|---|---|---|---|
| 0421090 | 4/1992 | European Pat. Off. | B60K 11/04 |
| 0478403 | 4/1992 | European Pat. Off. | 180/68.4 |
| 0484641 | 5/1992 | European Pat. Off. | B60K 11/04 |
| 4035347 | 11/1991 | Fed. Rep. of Germany | 180/68.4 |
| 2132951 | 7/1984 | United Kingdom | B60K 11/04 |

*Primary Examiner*—Margaret A. Focarino
*Assistant Examiner*—Florian Zeender
*Attorney, Agent, or Firm*—Klaus J. Bach

[57] ABSTRACT

In a mounting arrangement for supporting a radiator in a motor vehicle the radiator is pivotally supported by a first pair of pins extending from its narrow side while a second pair of pins which is spaced from the first pair of pins is engaged by flexible holding members locating the radiator in a predetermined installation position but permitting the radiator to yield when subjected to impact forces thereby to void damage to the radiator.

7 Claims, 2 Drawing Sheets

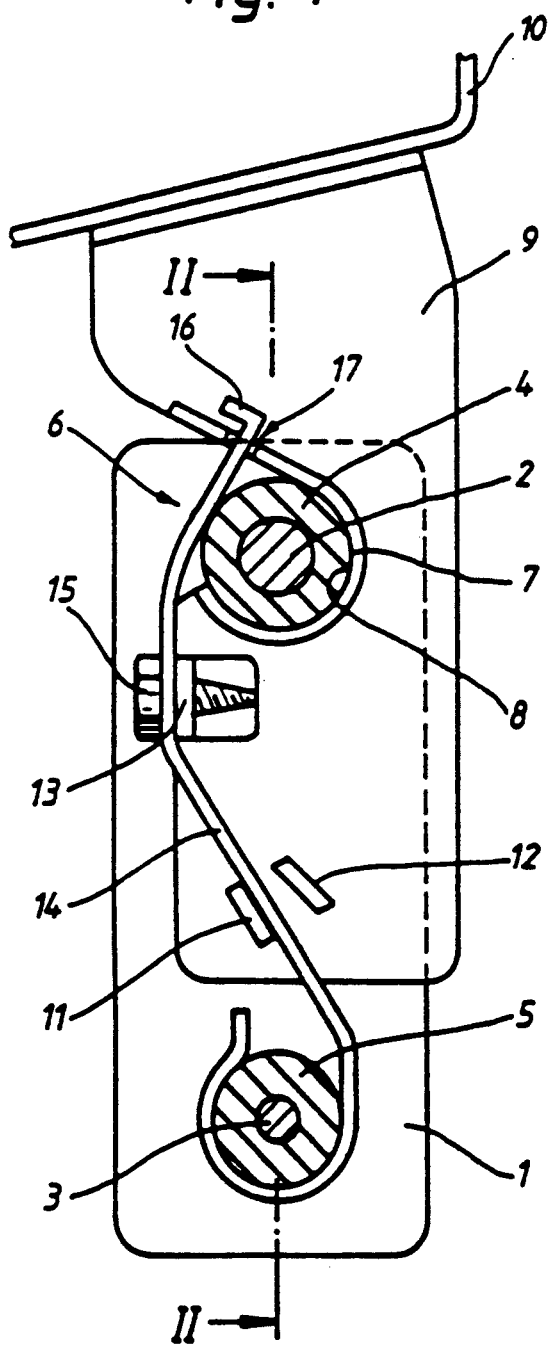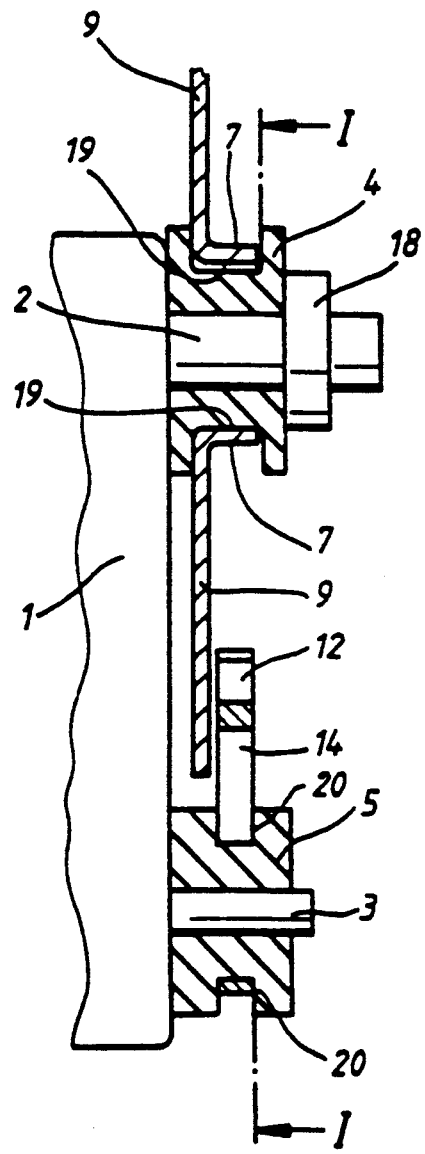

MOUNTING ARRANGEMENT FOR A RADIATOR

BACKGROUND OF THE INVENTION

The invention concerns an arrangement for mounting a radiator in a motor vehicle.

A radiator mounting arrangement is known from DE-PS 39 33 410 in which a radiator is supported by pins located on opposite narrow sides of the radiator by means of elastic sleeves disposed in recesses which are formed in support members fixed to the vehicle. Securing elements are used to fix the installation position of the radiator.

It is the main object of the invention to provide a radiator mounting arrangement wherein the radiator is so supported that it can, if required, be pivoted relative to its installation position to avoid damage when it is subjected to impact forces.

SUMMARY OF THE INVENTION

In a mounting arrangement for supporting a radiator in a motor vehicle the radiator has upper and lower opposite support pins projecting outwardly from its opposite narrow sides and the vehicle has two spaced support panels provided with opposite recesses receiving two of said opposite support pins for supporting said radiator pivotally while the other support pins are engaged by flexible holding members locating the radiator in a predetermined installation position but permitting the radiator to pivotally yield so as to avoid damage to the radiator when it is subjected to impact forces.

Preferably the upper pins are received in the support panel recesses and the lower pins are engaged by leaf springs which are prestressed and held in position by abutting stops with a predetermined force so that the radiator is firmly held in its installation position and yields only when the impact forces exceed the spring prestress forces.

The use, at each side, of only one pin to support and one leaf spring to retain the radiator in its installation position has the advantage that the radiator is pivotable about the axis of the support pins. In the case of a frontal collision, the radiator can therefore pivot away towards the rear so that damage to the radiator, or to a yielding front spoiler, can be avoided. The arrangement according to the invention also offers the advantage that, for installation, the radiator is positioned in a preliminary fashion after it is hooked into the recesses so that the mounting of further assembly parts is simplified.

The prestress on the leaf spring prevents the radiator from being pivoted rearwardly or from oscillating by relatively small forces such as the forces generated by the dynamic pressure of the cooling air or by road vibrations. The installation position is determined by a first stop, with which the prestressed leaf spring is in contact. Also, the pivoting range of the radiator may be limited by a second stop. To retain the support pins in the recesses the insertion opening is closed by the leaf spring.

The leaf springs may be mounted on an intermediate panel which makes it possible to prestress the leaf spring on a separate device and thereafter to fasten the pre-assembled intermediate panel on the support panel. Finally, a lug may be formed on the intermediate panel which can be inserted into an opening in the support panel so that, after fastening with a single bolt, rotation of the intermediate panel relative to the support panel is prevented.

BRIEF DESCRIPTION OF THE DRAWINGS

FIG. 1 is a side view, in section, along the line I—I in FIG. 2, of a radiator mounting arrangement according to the invention;

FIG. 2 is a front view, in section, along the line II—II of FIG. 1; and

DESCRIPTION OF A PREFERRED EMBODIMENT

Figure 3:
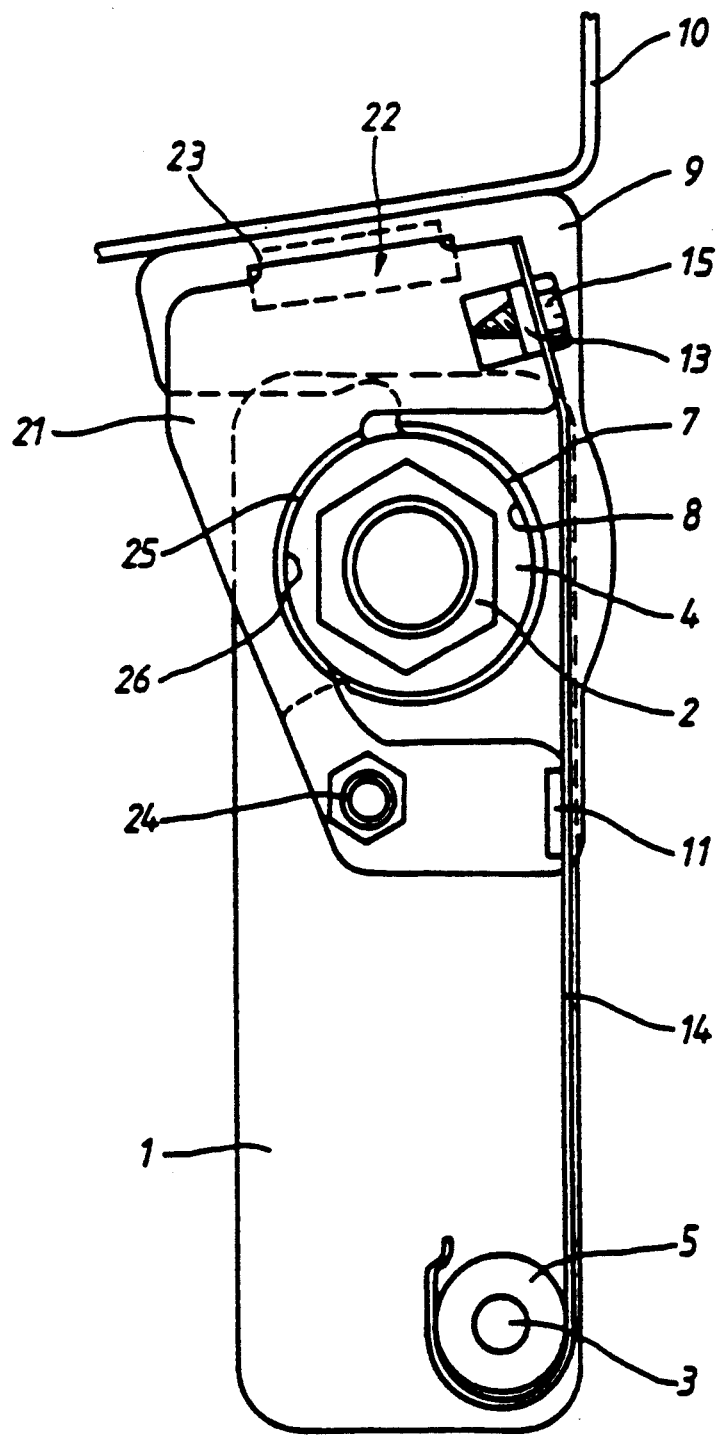
FIG. 3 shows, in a side view, another embodiment of a radiator mounting arrangement according to the invention.

FIGS. 1 and 2 show the mounting arrangement according to the invention on the narrow side of a radiator 1 in a motor vehicle which itself is not shown. Because the support arrangement is symmetrical only one of the narrow sides of the radiator is presented or described herein.

Two pins 2 and 3, which are supported by elastic sleeves 4 and 5, are mounted on the narrow side of the radiator 1 in a vertically spaced relationship. The pin 2, with the elastic sleeve 4, is located above the center of gravity of the radiator and is held in a recess 8 in the support panel 9, the recess 8 being provided with an insertion opening 6 and a flanged edge 7. A bracket 13 and two stops 11 and 12 are located beneath the insertion opening 6 on the support panel 9, which is fastened to a crossmember 10 of the vehicle. A leaf spring 14 is mounted on the bracket 13 by means of a self-tapping screw 15. From this mounting point, one part of the leaf spring 14 extends upwardly above the bracket 13 and one part extends downwardly below the bracket 13. The upper part of the leaf spring 14 extends across and beyond the insertion opening 6 and has an angled end 16 which is received in a cut-out 17 of the flanged edge 7 of the recess 8. The lower part of the leaf spring 14 is disposed between the two stops 11 and 12, and has an end region which is formed in the shape of a hook and encloses the lower pin 3 with the elastic sleeve 5.

For mounting the radiator 1, the elastic sleeves 4 and 5 are pushed onto the pins 2 and 3. In order to prevent the elastic sleeve 4 from sliding off, the pin 2 has a head 18. The radiator 1 is then hooked into the recess 8. For this purpose, the pin 2 with the elastic sleeve 4, which has a groove 19 to accommodate the flanged edge 7, is inserted into the recess 8 via the insertion opening 6. The radiator 1 is then suspended such that it can pivot about a horizontal axis defined by the pin 2. This eliminates the need for holding the radiator during the further assembly so that other parts, for example the leaf spring 14, can easily be fitted.

The angled end 16 of the leaf spring 14 is hooked into the cut-out 17 of the flanged edge 7 of the recess 8 and the leaf spring is then fastened to the bracket 13, and consequently to the support panel 9, by means of the self-tapping screw 15. The pin 2 is therefore prevented from sliding out of the recess 8.

The leaf spring 14 is prestressed so as to firmly engage the first stop 11 which is offset to the rear in the longitudinal direction of the vehicle relative to the plane defined by the bracket 13. In order to ensure accurate contact between the leaf spring 14 and the first stop 11, the stop 11 is additionally tilted relative to the vertical. The hook-shaped end of the lower part of the leaf spring 14 encloses the elastic sleeve 5, which is provided with a groove 20.

The prestress of the leaf spring 14 ensures that the radiator 1 remains firmly positioned and cannot oscillate during normal operation of the vehicle. The radiator 1 however pivots away toward the rear when a certain force is exceeded, for example, when a front spoiler is pushed back in the case of a frontal collision. Damage to the radiator 1, or to the front spoiler, can be avoided in this manner. Also, during normal operation of the motor vehicle the air outlet flow region behind the radiator remains undisturbed.

The use of the stop 11 to prestress the leaf spring to define the normal position of the radiator also offers the advantage that no additional forces act on the elastic sleeves 4 and 5 apart from the gravitational force of the radiator 1. Good structure-borne noise suppression is achieved in this manner.

The second stop 12 is offset even further towards the rear, in the longitudinal direction of the vehicle, relative to the first stop 111. It is used for limiting the pivoting movement of the radiator 1 as the leaf spring 14, and therefore the radiator 1, can pivot rearwardly only until the leaf spring 14 engages the second stop 12. In order to provide the leaf spring 14 with the largest possible contact surface, the second stop 12 is tilted even further from the vertical than the first stop 11.

FIG. 3 shows another embodiment of the invention. Here, the radiator support arrangement is presented in a side view, the same parts being designated by the same reference numerals as in FIGS. 1 and 2. In this embodiment, the radiator support arrangement includes an intermediate panel 21 to which the stops 11 and, if appropriate, 12, and the bracket 13 are attached. This makes it possible to mount the leaf spring 14 to the intermediate panel 21 before assembly of the motor vehicle and then to attach the pre-assembled component to the support panel 9. For this purpose, the support panel 9 has an opening 22 in the region above the recess 8 formed in the intermediate panel 21. The intermediate panel 21 is supported in this opening 22 by means of a lug 23 which extends from its upper edge and is inserted into the opening 22 and the intermediate panel is firmly fastened to the support panel 9 by means of a bolt 24.

In order to prevent the pin 2 from sliding out of the recess 8, the intermediate panel 21 is provided with a curved region 26 for engaging the pin 2. The intermediate panel 21 is installed on the support panel such that it extends over the insertion opening 6 and closes the recess 8, the intermediate panel 21 also having a flanged edge 25 in the curved region 26. In this embodiment the bracket 13 for fastening the leaf spring 14 on the intermediate panel 21 is located in the region above the pin 2 whereas the stop 11 is mounted in the region below the pin 2. This provides for a longer leaf spring 14 to be used so that mechanical stresses on the leaf spring 14 are relatively low. The second stop for limiting the pivoting range of the radiator 1 is provided by a stop structure (not shown) on the vehicle body. Also, the lower pin 3 is preferably offset towards the rear in the vehicle longitudinal direction relative to the upper pin 2. Finally, in a further advantageous embodiment of the invention, the pins 2 on opposite sides of the radiator are simultaneously used as inlet and outlet connections for the medium to be cooled in the radiator.

What is claimed is:

1. A mounting arrangement for supporting a radiator in a motor vehicle, said radiator having opposite narrow sides and upper and lower support pins projecting outwardly from each of its opposite narrow sides and being disposed in spaced relationship from one another and provided with elastic sleeves, and said vehicle having two spaced support panels provided with opposite recesses receiving two of said pins with said elastic sleeves for supporting said radiator pivotally in said opposite recesses, the other of said support pins being engaged by leaf springs mounted on said support panels, said support panels including first stops and said leaf springs being mounted on said support panels in a prestressed manner so as to abut said first stops with a predetermined force for locating said radiator in a predetermined installation position but permitting the radiator to pivotally yield so as to avoid damage when subjected to impact forces in excess of said predetermined force.

2. A radiator mounting arrangement according to claim 1, wherein said upper pins are received in said recesses for pivotally supporting said radiator and said leaf springs engage said lower pins.

3. A radiator mounting arrangement according to claim 1, wherein second stops are provided spaced from said first stops so as to engage said leaf springs for limiting pivot movement of said radiator about the two pins supported in said recesses.

4. A radiator mounting arrangement according to claim 2, wherein said recesses having openings at one side and said leaf springs extend across said openings so as to engage and retain the pins received in said recesses.

5. A radiator mounting arrangement according to claim 1, wherein said leaf springs are mounted on intermediate panels which are mounted on said vehicle support panels so as to permit preassembly of said leaf springs before the intermediate panels are mounted on said support panels.

6. A radiator mounting arrangement according to claim 5, wherein said intermediate panels include curved regions extending across said recesses for retaining said upper pins therein when said intermediate panels are fixed to said support panels.

7. A radiator mounting arrangement according to claim 5, wherein said intermediate panels are provided with lugs and said support panels have openings adapted to receive said lugs for appropriately locating said intermediate panels on said support panels.

* * * * *